June 26, 1928.
R. L. EMERSON
METHOD OF MAKING A COFFEE INFUSION
Filed June 16, 1922
1,674,857
2 Sheets-Sheet 1
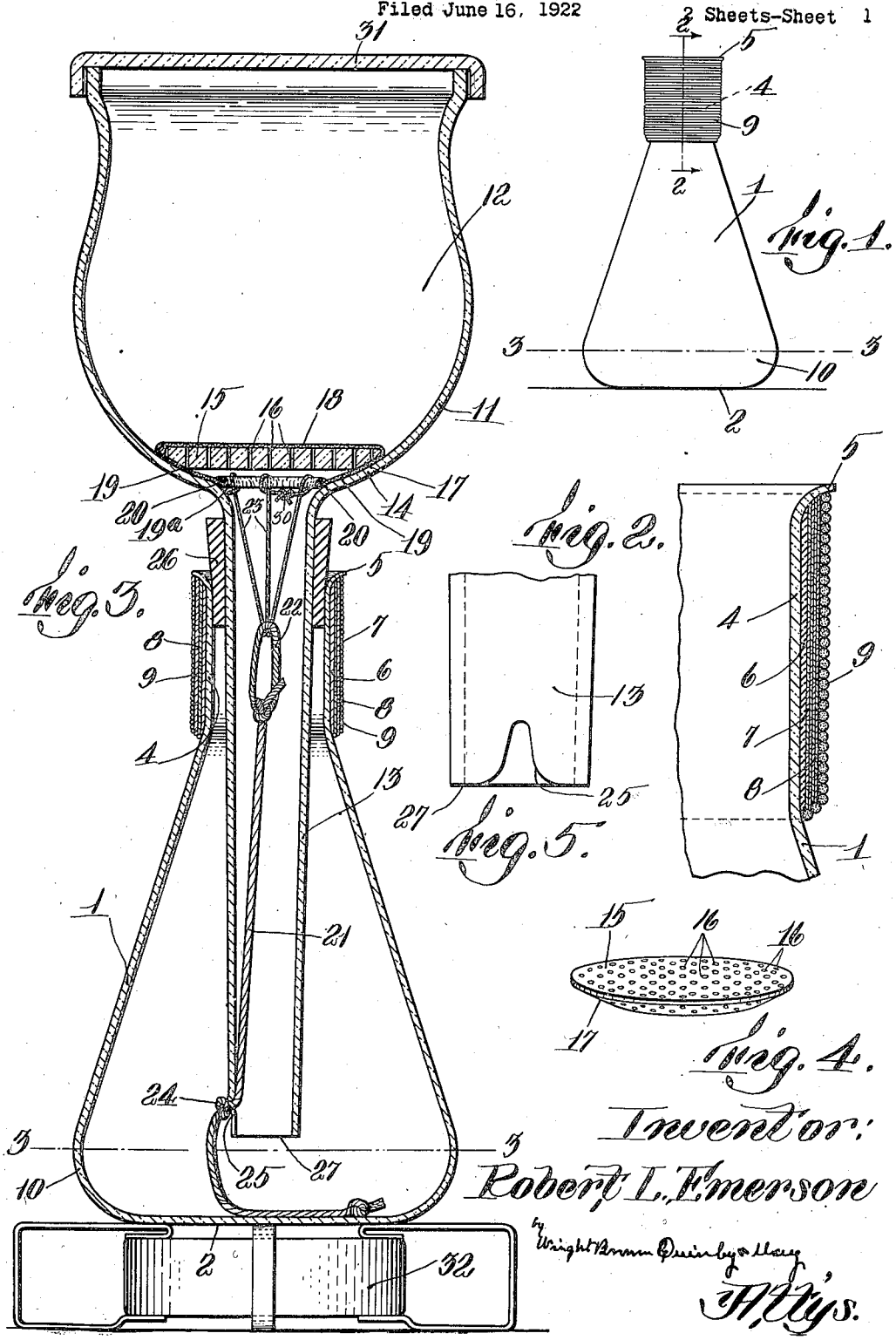
Inventor:
Robert L. Emerson June 26, 1928.  
R. L. EMERSON  
METHOD OF MAKING A COFFEE INFUSION  
Filed June 16, 1922   2 Sheets-Sheet 2
1,674,857
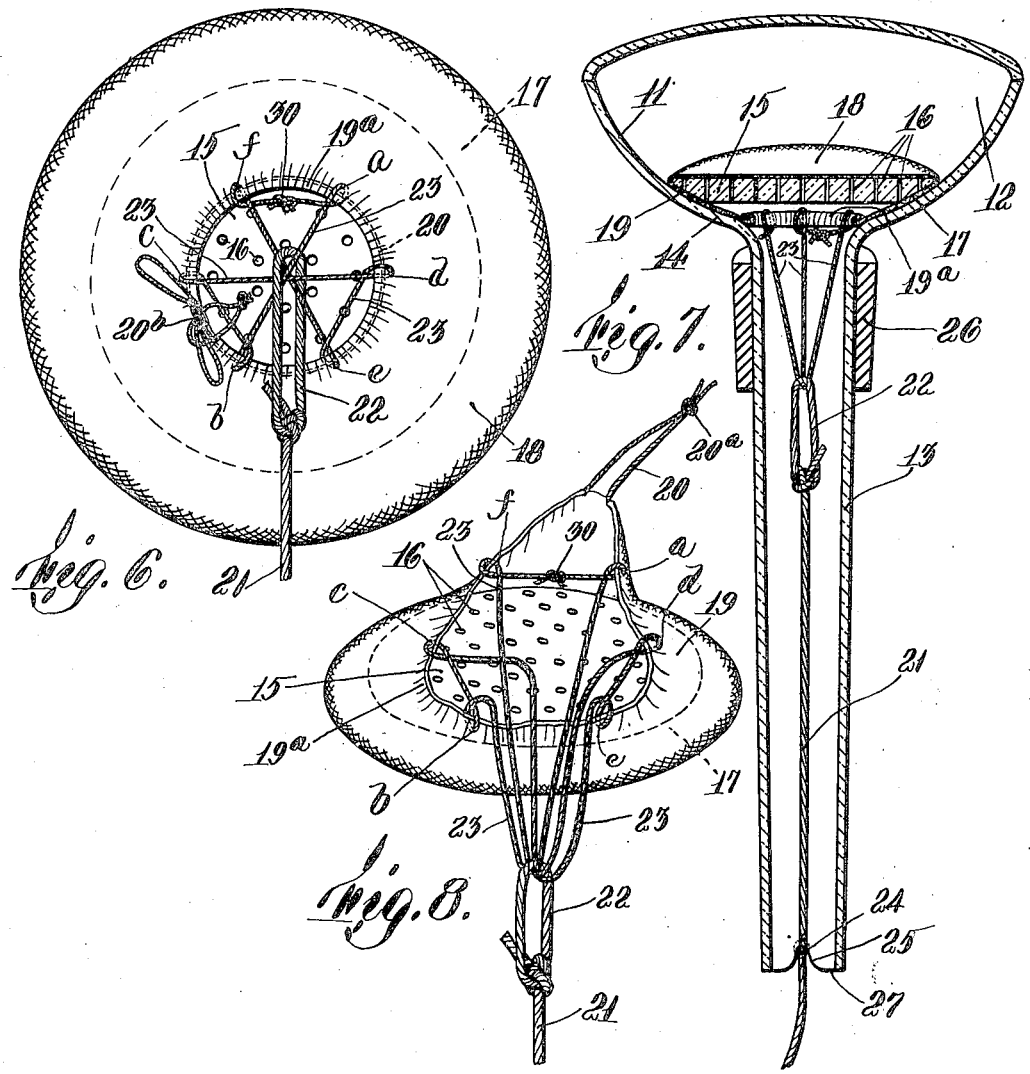
Inventor:  
Robert L. Emerson  
by Wright Brown Quinby & May  
Attys.

Patented June 26, 1928.

1,674,857

UNITED STATES PATENT OFFICE.

ROBERT L. EMERSON, OF WASHINGTON, DISTRICT OF COLUMBIA.

METHOD OF MAKING A COFFEE INFUSION.

Application filed June 16, 1922. Serial No. 568,794.

This invention relates to a new and improved process and machine for making true coffee infusion or beverage coffee and the beverage coffee so produced.

While my improved process may be practiced with various forms of apparatus, I prefer the machine invented by me shown in the annexed drawings, which is known as the "Empress coffee machine".

The said "Empress coffee machine" comprises in general a flat bottomed glass flask constituting a storage chamber adapted to be placed over a gas flame or over or upon any desired source of heat, and formed with a neck or outlet, a glass funnel, the bowl of which constitutes an infusing or extracting chamber, the stem of the funnel being adapted to be inserted in the neck of the flask and removably secured in place by an air tight joint connection between said stem and the neck of the flask. A strainer member is positioned in the funnel across the throat of the funnel stem. The extracting chamber or bowl of the funnel above the strainer is designed to hold hot water and ground roasted coffee during the process of infusion or extraction of the desirable ingredients from the ground coffee by the hot water. In this step the heating unit should be adjusted so that the water forced up from the flask into the funnel bowl is maintained in said bowl or extracting chamber at a temperature below 95° C. When the water in the flask has come to the specified temperature, the ground coffee is then introduced in the water in the funnel bowl above the strainer and kept stirred until the grounds sink to the bottom of the bowl upon the strainer and do not tend to rise just below the fine foam or froth on the surface. This result is reached ordinarily in 1 to 2 minutes, depending upon the size of the machine, but if the step is continued beyond 2 minutes, there is danger of impairing the flavor of the coffee infusion. At this time the machine should be removed entirely from the source of heat, when the confined expanded air on top of the water in the flask will contract, causing a partial vacuum and the drawing down of the infusion from the extracting chamber or funnel bowl through the moist coffee grounds, through the strainer and the stem of the funnel into the flask or storage chamber.

By having and maintaining the water in the funnel bowl at the desired temperature, not only at the time of introducing the ground coffee, but also during the step of infusion, and removing the flask from the source of heat as soon as the coffee infusion step is sufficiently carried out, the coffee infusion is free from boiled, cooked, or bitter taste, which is always present when the infusion is made at or near the temperature of boiling water or brought to such temperature after being made, which destroys the characteristic, distinctive and delightful flavor and aroma of the freshly roasted coffee bean.

Further, all surfaces and parts of the machine touchable by or liable to contact with or to be brought into contact with the hot water, the ground roasted coffee or the coffee infusion, are of inert material, that is, non-corrosive, non-absorbent and non-attackable by the substance used or any of its ingredients, (in this case ground roasted coffee bean), or by the solvent used or any of its ingredients, (in this case water), or by the infusion or any combination or vapor formed or produced, or, briefly, any contents of the flask, and does not impart any flavor or substance or ingredient to the infusion; and it is in this sense that the word inert is used by me in the specification and claims with reference to all the interior surfaces and parts of my extracting machine. By using inert material in the places indicated, neither the hot water nor the ground roasted coffee nor the coffee infusion nor any combinations formed or produced, or, in other words, any contents of the machine, touches or can touch or be touched by any metallic part or surface at any point, at any time. I have found as a result of a long series of careful laboratory experiments and tests that coffee infusion, where the latter at any stage of its production or serving is brought in contact with metal, will attack the metal to such an extent that the metal can be detected in the infusion both chemically and by taste. This metallic element is a serious defect in beverage coffee, since it not only disguises and masks the real flavor of the roasted coffee bean substance, but in addition produces a bitter or metallic flavor which, once recognized as such, is not only easily distinguishable but objectionable.

Coffee infusion made in accordance with my invention not only possesses the characteristic and desirable ingredients of the roasted coffee bean substance, but is free from the undesirable ingredients heretofore referred to, and is also free from any metallic ingredient or taste and is therefore what I term herein a true infusion and to be distinguished from an infusion carrying foreign or undesirable ingredients.

Referring to the drawings showing my new or "Empress coffee machine",—

Figure 1 in front elevation shows a glass flask having a relatively broad base for the purpose of stability and a flat bottom for engaging a heated surface or resting over a flame and made of glass, or inert material, such as is in common use in laboratories, designed and adapted to withstand relatively high changes of heat and cold;

Figure 2 is a vertical sectional view on the line 2—2 of Figure 1 through the neck of the flask, showing the insulating material applied to the neck of the flask to prevent injury to the fingers in handling the flask;

Figure 3 is a vertical sectional view through the machine showing the flask and funnel and their respective parts assembled in operative position;

Figure 4 is a detail perspective view of a disc of porcelain or other inert material formed with holes, said disc being designed and intended to support and seat at the throat of the funnel a strainer such as cloth or other suitable inert material;

Figure 5 is a front elevation of the lower end of the stem of the funnel, showing the notch for seating and holding a knot on a holder of inert material, illustrated as a cord, for holding and seating the strainer and its disc against the inner surface of the throat of the stem;

Figure 6 is a bottom plan view showing the strainer applied to the disc and the method of connecting the strainer to the cord or holder for seating the strainer against the throat of the funnel;

Figure 7 is a sectional detail perspective view showing the funnel, the strainer and its disc, and the holder for seating and holding the strainer in position against the throat of the funnel;

Figure 8 is a perspective view showing the method of removing the disc from the strainer without detaching the elements which bind the strainer to the cord or holder when it is desired to wash or "boil out" the strainer, the disc being reinserted in place thereafter by reversing the steps of removal.

1 represents a flask or storage chamber formed with a flat base 2 to insure sufficient and satisfactory heat conduction and so that it can be stood on the surface of a stove or over or upon a gas burner or alcohol stove as 32, or any desired source of heat, after the manner of any chamber, the contents of which it is desired to heat. If the flask were formed with a round bottom, it would not maintain its position upon or over a heating surface without some support, which support is not necessary where the flask is made with a flat bottom, as shown. The flask, as shown, flares outwardly from the base 2 up to a point indicated by the dotted line 3—3, Figure 1, and thereafter the sides of the flask extend upwardly inclining inwardly to form a neck 4 having vertical walls to seat the stopper hereinafter described. The neck terminates in a finished lip 5. Such flasks are preferably made out of glass or other suitable material whose surface liable to contact with the water or any of the contents of the flask is inert, that is, like glass, non-corrosive, non-absorbent and non-attackable by the contents of the flask or any of its ingredients; the flask being capable of withstanding sudden changes of heat and cold. A satisfactory material for such flasks is now on the market known as pyrex. I do not wish to limit myself, however, to glass for the flask, it being understood that any suitable material may be used whose interior surfaces and parts are inert.

Preferably, of course, pure spring water is used, or water free from chemical or other impurities. I have found as a result of the tests to which I have referred that strongly alkaline waters, though themselves potable, are unsuitable for making satisfactory infusions even in my machine, because of the flavor effect produced by the mineral salts contained in the water, the result being the same as if the salts had been derived from the surface of the flask instead of from the water, as would be the case where the surface of the flask was attacked either by the water, the ground coffee or the infusion, or any combination formed or produced, or, briefly, any contents of the flask.

Referring to Figure 2, 6 represents a sheet of asbestos applied to the neck 4 of the flask below its finished lip 5. 7 represents a winding of electric tape or other suitable material on the sheet 6 to hold the latter in place. 8 represents a sheet of paper or other suitable material laid over the electric tape to confine its sticky or adhesive properties and to make a satisfactory surface upon which to put the exterior cord winding 9, which is applied to the surface of the paper 8. I find the foregoing a satisfactory way of insulating the neck of the flask from heat sufficiently so that it can be conveniently and comfortably handled by the fingers when pouring the infusion from the flask or handling the flask and its funnel. Any other suitable or desired means may be employed in place of the means I have described, as, for instance, a piece of rubber tubing or other material may be slipped over the neck of the flask, or in place of this any satisfactory wrapping or covering may be used on the fingers and thumb.

The space 10 between the bottom 2 of the flask and the line 3—3 of Figures 1 and 3 represents in general the minimum depth of water that should be maintained in the flask at all times while the flask is being subjected to any heating agent, in order to protect the flask from the action of heat at a point not protected by water, and further to leave in the flask a minimum amount of water, so that upon the return of the infusion into the flask, the water remaining in the flask to be mingled with the infusion, while the water may be above 95° C., will be of such relative small volume compared to the infusion as not to substantially affect the infusion or raise its temperature to or above 95° C. The general proportion shown in the drawings is, I have found, sufficient for all practical purposes.

If the walls of the flask 1, beginning at the base 2, flared outwardly rather than inclined inwardly for an appreciable distance above the line 3—3, then the glass above the line or water level 3—3 would be subject to the direct action of heat, and being unprotected by water on the inside is more liable to damage and frequent breakage than when the side walls are inclined inwardly, as shown in the drawings, and as used in my machine, since the outwardly flaring walls above referred to would be acted upon by the heat of a flaring flame, which is not the case in the construction shown in the drawings where the walls are inclined away from the effect of the flaring flame or a heating agent extending up the side of the base.

Referring to Figure 3, 11 represents a funnel consisting of a bowl constituting an extracting or infusing chamber 12 and a stem 13 integral therewith. Preferably, this funnel is composed of glass, also preferably made of highly annealed glass in order to withstand sudden changes of heat and cold, but it may be made of any other suitable inert material having the requisites and free from the objections heretofore described by me in connection with the material of the flask. The shape of the bowl, as illustrated, is a convenient shape, for when the bowl is more or less filled, its center of gravity is brought lower than it would be if the bowl were V-shaped. Further, the bowl formed as shown is reasonably within the limits of the base of the flask, which would not be true if the sides of the bowl flared in a V-shape, in which latter shape the center of gravity of the contents of the bowl would be raised and the sides of the bowl would extend too far beyond the base of the flask for stability. The walls of the bowl from the top of the stem are inclined outwardly and upwardly, as shown at 14, to furnish a seat for the under surface of a disc 15, see Figure 4. This disc may be made of porcelain, glass or any inert material having the requisites and free from the objections to which I have already called attention. In practice I have made use of a porcelain disc. This, as shown, is disc-shaped, formed with a series of holes 16 to permit the water from the flask being forced up through the disc into the bowl 12 and to permit the infusion to be drawn from said bowl through said holes into the flask. This disc, as shown in Figure 3, is flat on its top face and may be flat, as shown, at the central part of its bottom face, but the lateral edge of this disc on the under side is beveled as at 17 to correspond in a general way with the inclination of the inner face of the bowl at 14 so that the disc can properly seat its packing against the surface of the bowl at 14.

While the disc by itself may be used, I prefer to employ in connection with this disc or spreader, as shown, a cover 18 of fibrous material such as Canton flannel, fine mesh linen or any inert material of good filtering quality, so that it will permit the ready passage of the water up through it and the ready passage of the infusion downward into the flask, retaining on its upper surface the coffee grounds. In any event, some means should be provided to maintain the disc or the disc and its cover or any equivalent device on its seat at or near the upper opening of the stem 13, otherwise the action of the hot water in being forced up into the bowl or the action of the steam or vapor formed in the flask will tend to lift the disc or other device from its seat. Further, the disc or some equivalent device must be employed at the point indicated to effect the separation of the coffee grounds from the infusion as well as to prevent the ground coffee getting into the flask and thus brought into contact with the water therein, as well as to prevent the coffee grounds passing into the flask with the infusion. Without the disc, the funnel would be useless and the ground coffee might as well be put in the flask in the first instance and treated as in a coffee pot, assuming that the inner surface of the latter is glass or other inert material having the desirable features and free from the objections heretofore noted. The cloth cover or strainer 18 above referred to is cut in disc form, having a diameter greater than the disc 15 sufficient to be lapped over the edge of the disc on the under side to cover its inclined beveled edge 17, as shown at 19 in Figure 6. The portion 19 of the strainer 18, Figure 6, in engagement with the beveled edge 17 of the disc constitutes in effect not only a strainer member but a packing member. By constructing and arranging the strainer member as stated, a more extended packing face is secured than if the strainer member stopped near the edge of the disc. The disc 15 serves as a form or spreader about which to secure the strainer 18, serving not only to hold the strainer in its extended position across the throat of the funnel, but also to maintain the strainer by its inclined face 17 to provide a smooth and uniform surface for the strainer at that point so that the latter can act as a packing against the complemental face of the bowl. The strainer not only acts as a strainer, but that portion of it on the face 17 of the disc acts as packing.

A convenient way for maintaining the strainer cloth 18 upon the disc is by running a puckering string 20 in a hem 19$^a$ on the inner edge of the part 19, see Figure 8, and tying the ends in a double or square knot 20$^a$. By pulling the string 20 and tying it by a square bow knot 20$^b$, the strainer member may be secured upon the disc. In order to hold the disc and the strainer member against the seat or the walls 14 of the bowl, I have found it desirable to use yielding means as well as inert in order to prevent undue pressure on the walls of the bowl at 14, which might cause breakage due to the strain produced. For this purpose I have found by tests that a loosely twisted cotton cord 21 is entirely satisfactory. The upper end of this cotton cord 21 should not be secured directly to the disc 15, nor to the cloth strainer 18, but preferably to an intermediate member, the latter at its upper end or ends being secured to the hem 19$^a$ of the strainer at the margin of the edge 19 and around the puckering string 20. If the cord 21 be secured directly to the disc there is a likelihood, as I find by tests and experiments, that the pressure of maintaining the water in the bowl tends to "balloon" the upper surface of the cloth strainer and may detach the cloth strainer from the disc at some point. While any desired means may be employed for connecting the upper end of the cotton cord 21 with the cloth strainer, I have found the construction and arrangement shown in the drawings and particularly in Figures 6 and 8 mechanically effective and very convenient and desirable, since it gives a yielding self-seating action between the disc and the cord 21 and further permits the ready removal of the disc from the cloth strainer for the purpose of washing or "boiling out" the latter. As shown in Figure 8, I form a permanent loop 22 at the upper end of the cord 21. As here shown, this loop is formed by an ordinary bowline knot. The form of knot is unimportant. The essential thing is to form a permanent loop at this point.

For the purpose of connecting the loop 22 with the hem of the strainer cloth I may use a linen string or thread 23, which may be single or double. I prefer to use two threads together or a double thread. A needle may be employed for attaching the thread 23 to the hem of the cloth strainer and passing the thread 23 through loop 22 in the following manner, see Figure 8: Assuming that a needle and the thread 23 are employed, starting at $a$ the needle is passed between the disc and the inner face of the strainer 18 outwardly, back of the puckering string 20, through the strainer and carried over the puckering string through the loop 22, then between the disc and the inner face of the strainer, brought out through the strainer, back of the puckering string, at $b$, then up over the puckering string under the stitch $a$ to $b$ of the string 23, to the point $c$ between the disc and the strainer, back of the puckering string, up through the strainer, up over the puckering string, under the stitch $b$ to $c$, through the loop 22, to the point $d$ where it again is passed between the disc and the strainer, brought up through the strainer, back of the puckering string, and over the puckering string 20, then passed under the stitch $c$ to $d$ of the string 23 to the point $e$, where it again is passed between the disc and the strainer, back of the puckering string, up over the puckering string under the stitch $d$ to $e$ of the string 23, through the loop 22 to the point $f$, where it is passed between the disc and the strainer, back of the puckering string, up over the puckering string under the stitch $e$ to $f$ of the string 23, then over the stitch $a$ to $b$ and the two ends of thread 23 tied together by a "weaver's knot" or "sheet bend" 30 that passes through the strainer cloth readily and will not catch like an ordinary knot and hold on the cloth. The length of the stitches of the thread 23 across the opening in the strainer should be sufficient so that there will be room enough for the valve when freed from the cloth strainer to be slid out between the stitches without untying the square knot 20$^a$ in the puckering string 20 or the "weaver's" knot 30 of the thread 23. The foregoing arrangement is merely one practical and efficient way of making the desired connection between the strainer cloth and the loop 22 by the use of inert material, since when the loop 22 is pulled down to seat the disc, this pull will automatically slide the stitches in the loop until the loop reaches a position where it gives an even downward pull on all of the stitches and thus correctly seats the disc and holds it seated at all points.

24 represents a knot or bunch formed near the lower end of the string 21. In practice the string 21 is drawn through a notch 25 formed in the lower end of the stem 13, see Figure 3. This notch, as shown, is V-shaped. The knot 24 is formed at the desired length from the disc so that when the string 21 is drawn through the notch 25 the knot 24 engaging the outer wall of the funnel stem will hold the string 21 taut and the disc and its strainer under the desired yielding tension against the walls 14 of the funnel. There is a certain amount of stretch in this cord together with the stretch inherent in the strainer cloth and its string 23 sufficient to provide the necessary yielding function to avoid breakage or undue strain on the walls 14 of the funnel. The distance at which the knot 24 should be formed from the loop 22 is a very easy matter, free from any difficulty. If the string is not tight enough, the disc will not seat or maintain its seat properly; the only care that is necessary is not to pull the string unduly tight. There is no occasion for this in the first place, and in the second place it would make it difficult to get the knot into the notch 25. As a practical matter, this location would be where the knot can be readily pulled into the notch 25. 26 represents a truncated cone-shaped stopper formed with a central cylindrical hole, the outer wall of the stopper being inclined in order to properly seat against the vertical wall 4 of the neck of the flask. The opening through the stopper is of proper diameter to effect a snug fit upon the stem 13. For making coffee infusion I have found rubber satisfactory as a material for this stopper, since it is yielding, does not contact with the substance or the infusion or the solvent and is not attacked by the solvent vapor, or, briefly, any of the contents of the machine. Other suitable material can be employed if desired, the purpose of the stopper being to readily and removably position the stem of the funnel properly in the neck of the flask and also to make a practically air tight joint at this point. The stopper 26 is further adjusted at that point on the stem 13 so that the end 27 of the stem will be at a sufficient distance from the bottom 2 of the flask to permit enough water to remain in the flask to protect the outwardly flaring and curved sides of the flask from breakage by the direct application of a gas flame or other source of heat.

The operation of the machine heretofore described is as follows: The parts having been positioned as described, fill the flask or storage chamber with water either through the funnel with the strainer in position or through the neck of the flask until the flask is about two-thirds or three-quarters full when the funnel is in place. Cold or hot water may be used, hot water from the kettle preferably, in order to save time. Having firmly seated the funnel by means of the rubber stopper in the neck of the flask, place the flask over or on a gas burner, ordinary stove or range burning coal or wood, electric hot plate or alcohol stove 32, or any other desired source of heat. Continue the heating until the water is driven up through the strainer into the funnel bowl or chamber 12 and the column of water is broken in the stem by the escaping heated air and until the larger air bubbles have ceased to appear in the stem of the funnel. Then turn down the heat until the water tends to return to the flask, and then increase the heat a little. This may require a little practice at first. In other words, the water should be kept up in the funnel, but to secure the best results at as low a temperature as possible. I have found by experiments and tests that such temperature must be below 95° C. Below 85° C. in many instances the water may tend to return to the flask and will not remain in the funnel for the introduction of the ground roasted coffee. Above 95° C. there is a marked decomposition and disintegration of the substance of the coffee bean when introduced into water at said temperature, which imparts a most undesirable and disagreeable flavor to the infusion and which, once recognized, is decidedly objectionable and undesirable. Then add to the water which is in the funnel bowl 12 or the extracting or infusing chamber at the specified temperature freshly and finely ground roasted coffee. The amount of coffee to be used depends on the individual taste. An ounce of ground coffee bean to 12½ ounces of water will produce fairly strong beverage coffee. After the ground coffee has been added to the hot water in the funnel bowl, stir vigorously until all of the ground coffee is thoroughly wetted and tends to sink to the bottom of the funnel bowl and upon the strainer and no longer tends to float or rise just below the fine froth which is always on the surface of the water in the funnel. This generally takes from one to two minutes, depending on the size of the machine and the quantity of ground roasted coffee used, as heretofore described. If the heating is prolonged unduly at this stage, there is liable to be imparted an overcooked flavor to the beverage coffee. Therefore as soon as the ground coffee has been kept in contact with the water for a sufficient length of time, as above stated, remove the machine from the source of heat and the infusion in the funnel will be immediately drawn down from the funnel bowl through the strainer and the stem of the funnel into the flask or storage chamber. While the infusion is being drawn down into the flask, additional hot, not boiling, water from the kettle may then be poured into the funnel bowl, and thus added to the then formed infusion, to allow for the ⅓ or ¼ of the contents of the flask which was not put in at the beginning and for the loss of water due to its retention by the coffee grounds, or the additional water may be added to the infusion in the flask after the removal of the funnel. On the passage of all the infusion from the funnel into the flask, there is a sucking in of air through the moist coffee grounds, which tends to withdraw the aroma or other volatile ingredients of the moist coffee grounds into the infusion, now in the flask, and this continues until the air pressure within and without the flask is equalized. The stopper should not be loosened nor the funnel removed from the neck of the flask until this air current has practically ceased, which is indicated by large bubbles passing through the infusion in the flask. It will then be noted that the coffee grounds are in a more or less firm cake in the bottom of the bowl of the funnel and may even show cracks or fissures indicating that the coffee grounds are moderately dry. The funnel may then be removed and stood in inverted position on the cover 31.

The infusion in the flask should never be reheated. If it is desired to maintain the coffee hot for an appreciable time after it has been made, it should be set in a warm place but never should be placed back upon the gas burner or other source of direct heat. If the infusion thus obtained is not strong enough, more coffee should be used in the first instance, but the infusion should not be forced up into the funnel in contact with the coffee grounds a second time. If the infusion is too strong, the amount of coffee can in the future be reduced or the strong infusion can be diluted with hot, not boiling, water. The flask is so protected about the neck that the infusion can be easily poured therefrom and served at the table without any transference. The infusion within the flask should never be transferred for serving to other than a container having a lining or contacting surface of inert material.

The coffee bean should be ground in an ordinary coffee grinder, as fine as fine corn meal, but not through stone rollers or reduced as fine as flour or the so-called "Turkish ground" or "Greek ground" coffee. The advantage of finely ground coffee is that the maximum of flavor and desirable elements are withdrawn from a minimum amount of ground coffee in a minimum time, so that it is more economical and this method or process of making coffee is therefore the most economical known to me. If the coffee bean is too finely ground or powdered, like "Turkish ground" or "Greek ground" coffee, it is liable to swell when mixed with hot water and fill the interstices of the strainer and pack so tightly that the infusion will not be drawn back into the flask from the funnel.

My infusion is without any bitter, astringent, metallic or woody taste. If coffee is made in a metal coffee pot or comes in contact with metal in the process of making or serving, it acquires a peculiar flavor or taste which, once recognized, is objectionable and undesirable. I have found from tests and experiments that when coffee is brewed in the presence of metal, the metal, whether it be tin, copper or aluminum, can be detected in the beverage by a chemical test, and in my opinion the presence of the metal causes the disagreeable undesirable taste above referred to. On the other hand, by using my improved machine and following my process, instead of using a metallic container, and using the same kind and grade of roasted coffee, I have found as a result of tests that coffee infusion made in my improved machine and by my process is entirely free from these objectionable flavors. In my opinion the presence of metal ingredients in the infusion prepared in metallic containers is due to the metallic combination with some ingredient of the coffee bean, and created at the time of making the infusion. I find further as a result of my tests and experiments that coffee infusion prepared in my machine and subsequently stored or allowed to stand in a metal container acquires a distinctive metallic taste. The objectionable flavor due to a metal container I have found to be fairly characteristic, this being due to a combination of the metal with some soluble ingredient of the infusion and produced by the attack of the infusion upon the metal or vice versa. The length of time necessary for the infusion to stand in a metallic container or in contact with metal so that the metallic content could be determined chemically might require longer than for tests dependent on taste alone. According to my experiments and tests, the metal is attacked more actively by the infusion when made at temperatures in excess of 95° C. than when made at temperatures below 95° C., but in either case the action of the coffee upon the metal is detachable by chemical means and apparently the action upon the metal is in proportion to the degree of heat employed in making the infusion in a metal or non-inert coffee pot.

For the above reasons, among many, I have worked out my improved machine, rigidly discarding therefrom any interior element, surface or part that is not inert.

The temperature at which the coffee is brewed has a very decided influence upon the resulting infusion. If the temperature is in the vicinity of boiling water, above 95° C., there is an unpleasant boiled or woody taste, which is not acquired by the infusion if the temperature is kept below 95° C. From experiments I have ascertained that in an infusion prepared at or around 100° C. there is a decomposition of the substance of one or more of the ingredients of the roasted coffee bean, which is accompanied by a violent frothing or ebullition, with the formation of substances giving an undesirable and disagreeable taste to the coffee. For this reason I have confined my process to temperatures below 95° C.

The time of contact between the water and the ground coffee is of importance. I have found by experiments and tests that practically as much of the desirable ingredients of the coffee—both in substance and in flavor—is extracted in a minute or two as in five minutes or longer contact, while in the contact of more than two minutes there is acquired in addition a cooked or boiled taste that is undesirable. Further, in my infusion there is put into the infusion by the passing of air through the moist coffee grounds in the funnel and through the infusion a large part of the volatile portions and aroma that heretofore have been lost by dissipation into the surrounding air—a common enough experience to the average person, who has frequently detected the preparation of coffee brew by the odor in the room.

The cloudy or smoky appearance in coffee infusion is caused chiefly, if not wholly, by the brewing of the coffee at a temperature above 95° C. in the vicinity of 100° C. or by too long contact at a lower temperature, even in the neighborhood of 90° C. and is produced by a gummy substance, the composition and precise origin of which I have not, as yet, definitely determined. I find by experiments that this cloudy or smoky effect will begin to be present when the coffee is brewed even at 90° C. beyond 2½ to 3 minutes, and increases thereafter. Further, in my infusion in some instances, after it has stood for a period of three hours up to twelve hours or longer, I have observed what appeared to be the development of a cloudy or smoky appearance. The cause of this I have not, as yet, fully determined.

My coffee can be made of uniform strength,—as shown by tests—clear, transparent, without a cloudy or smoky appearance, and is a true infusion of the desirable soluble ingredients without the undesirable ones acquired by brewing in contact with metal or brewing at high temperatures or over long periods.

My process for making my infusion, while thus far described in connection with my machine shown in this application, is not limited to that form of machine, but may be practiced with many forms of machines or apparatus, the walls of whose chamber or chambers and connecting passages and parts are of inert material. So far as I am at present advised, the machine shown in this application is the best form of machine known to me for making my infusion or for making infusions by my process.

It will be observed that the main factors involved in my process comprise making the coffee infusion at the lowest practical temperature below 95° C., making the coffee infusion in the shortest practical time, both as to infusing the ground coffee in the water and the immediately following separation of the infusion from the coffee grounds; this process should be carried out in a coffee machine whose surfaces able to contact with the ground coffee, the water and the infusion, are composed of glass or other like inert material.

As is well known, coffee beverage or coffee infusion is made from the roasted coffee bean. The degree of roast given, however, apparently varies in different locations, seemingly a higher degree of roast being desired in latitudes near the Equator than is desired in latitudes in the Temperate Zone or farther from the Equator, and by the term "roast" I wish it to be understood as embracing the coffee bean substance which has been subjected to a roasting action, either the whole bean or otherwise, prior to the time of the infusion step.

While I have referred to temperature, heretofore it has been with reference, of course, to the use of water, that being the particular solvent used in making coffee infusion. My machine, however, can also be used for making not only infusions, but also for making extracts from a wide range of substances and using varying appropriate solvents having a wide range of boiling points. It will be understood, therefore, that apart from coffee infusion and in cases of making extracts generally, the temperature of the solvent will be regulated according to the requirements of the particular solvent used and the results desired, since my machine is capable of use both above and below 100° C. For illustration, without attempting an exhaustive enumeration of all kinds of substances or all kinds of solvents or all ranges of temperature with which my machine can be used, for making extracts the following illustration will indicate a range of use: Ether extract of soap at a temperature of boiling ether; a toluene extract of crude rubber; toluene having a relative high boiling point. In the use of my machine for making extracts with solvents other than water, the material of the stopper 26 should, of course, be inert to the action of the solvent or substance or combination or their vapors produced in that process.

Referring to Fig. 6 and the arrangement of the stitches a—b, c—d, and e—f made by the string 23, it will be noted that the long stretches of these stitches pass through the loop 22 and through the strainer cloth back of the puckering string 20, the thread continuing from one of said stitches or long stretches to the other by the short stretches d—e, b—c and f—a, each of said short stretches of the string 23 passing under one of the long stretches and over the next one. This arrangement is important, since the stitches, when pulled down by the cord 21 into the position shown in Fig. 7 and Fig. 3 by co-acting with the short or cross stretches, as shown, effect a "bight" on the puckering string and the strainer cloth. This "bight" keeps the points of attachment or the points of pull of the string 23 on the strainer cloth in a predetermined position so as to give a uniform pull on the whole strainer cloth and keeps the thread 23 positioned in the strainer cloth, as shown, and in a predetermined place, preventing said stitches approaching each other and thus increasing or decreasing the distance of the points of attachment, which would be the case but for the "bight" due to this described arrangement of the said cross strands or short stretches $d-e$, $b-c$ and $f-a$ with the long stretches or stitches $a-b$, $c-d$ and $e-f$, as shown.

I claim:

1. The process of making a true coffee infusion which consists in mixing fresh ground roasted coffee with water, maintaining said water and infusion between 80° and 95° C. for a period of not over three minutes, and after said period separating the coffee infusion from the coffee grounds before an appreciable quantity of any undesirable ingredient of the coffee bean substance has been released from said substance and taken up by the infusion.

2. The process of making a true coffee infusion which consists in mixing fresh ground roasted coffee with water between 80° and 95° C., maintaining said water and infusion between 80° and 95° C. for a period of not over three minutes, and thereafter immediately separating the coffee infusion from the coffee grounds.

3. The process of making a true coffee infusion which consists in mixing ground roasted coffee with water in a chamber whose interior touchable surfaces in contact with the water, coffee substance and said infusion are of inert material, keeping said water and infusion between 80° and 95° C. for a period of not over three minutes, and thereafter immediately separating the said infusion from the coffee grounds.

4. The process of making a true coffee infusion which consists in mixing ground roasted coffee with water in a suitable receptacle whose interior touchable surfaces are of inert material, maintaining said water and infusion between 80° and 95° C. for a period of not over three minutes, and immediately thereafter separating said infusion from the moist coffee grounds and causing an air current to follow said infusion through the moist coffee grounds and through said previously separated infusion to impregnate said infusion with a substantial quantity of volatile ingredients of the coffee bean substance remaining in said moist coffee grounds after the separation of the infusion.

5. The process of making a true coffee infusion which consists in mixing ground roasted coffee with water in a chamber whose interior touchable surfaces are of inert material, keeping said water and infusion between 80° and 95° C. for a period of not over three minutes, and immediately thereafter separating said infusion from the coffee grounds to prevent an appreciable quantity of any undesirable ingredient of the coffee bean substance being removed from said substance or taken up with the said infusion.

6. The process of making a coffee infusion which consists in heating water to a temperature between 80° and 95° C., adding ground roasted coffee to such heated water and stirring the coffee until the grounds are wetted and sink beneath the surface of the water, but for a total period of less than three minutes, meanwhile holding the temperature of the infusion above 80° C., and finally withdrawing the infusion from the coffee grounds.

7. The process of making a coffee infusion which consists in heating water to a temperature between 80° and 95° C., adding ground roasted coffee to such heated water and stirring the coffee until the grounds are wetted and sink beneath the surface of the water, but for a total period of less than three minutes, meanwhile holding the temperature of the infusion above 80° C., and finally forcing the infusion through and away from the coffee grounds by application of atmospheric pressure.

In testimony whereof I have affixed my signature.

ROBERT L. EMERSON.